United States Patent Office 2,808,801
Patented Oct. 8, 1957

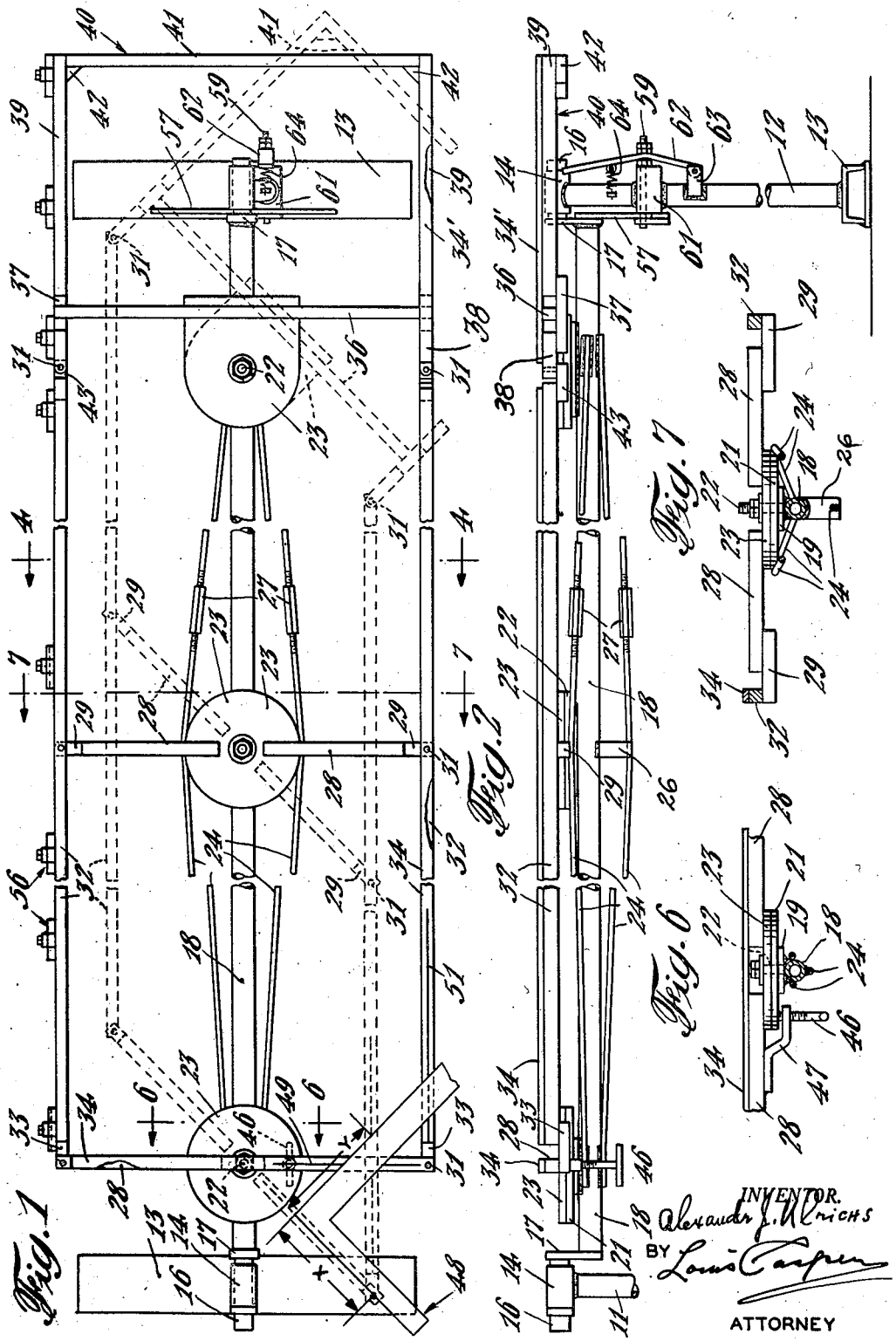

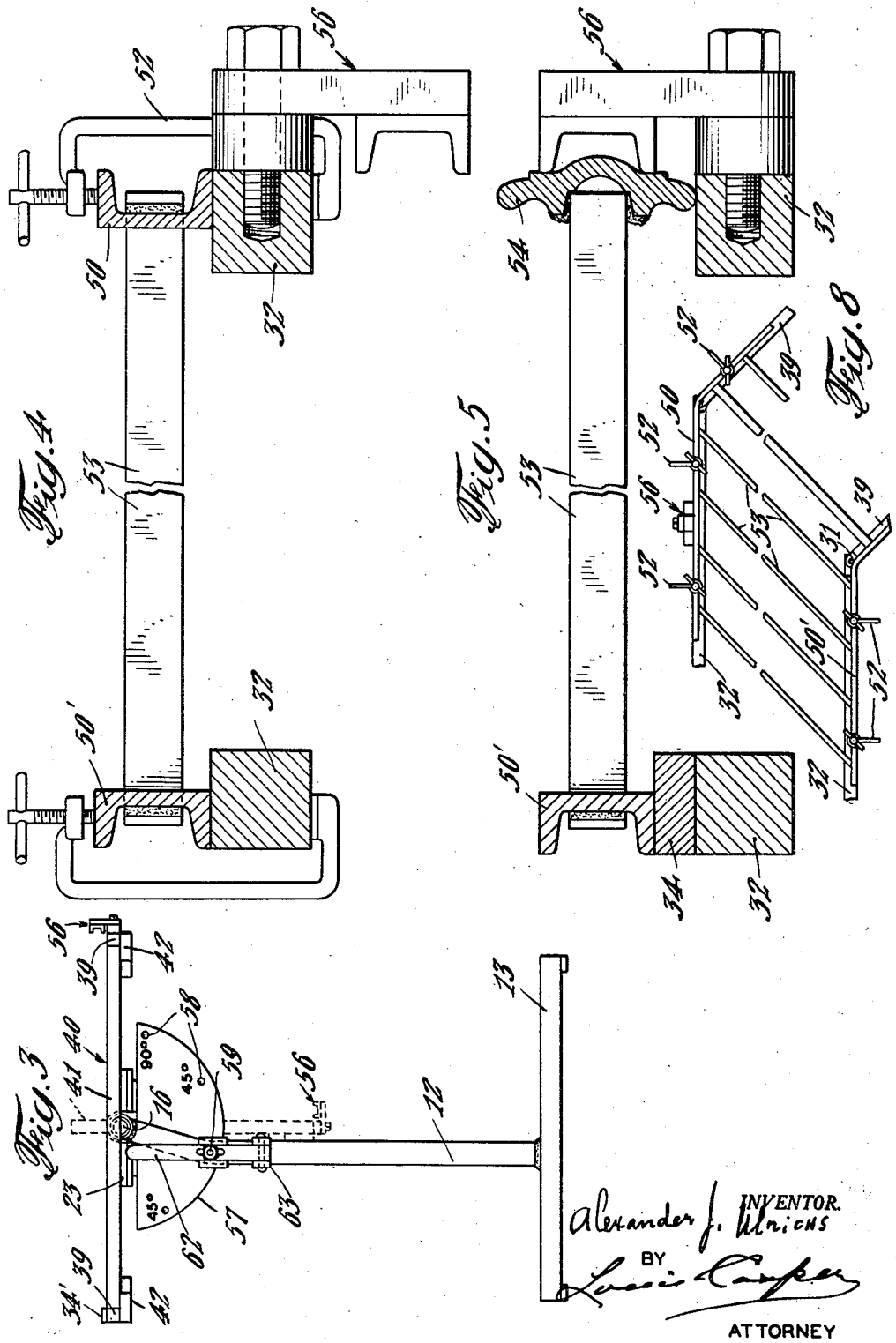

2,808,801

WORKING HOLDER FOR USE IN WELDING

Alexander J. Ulrichs, Mahwah, N. J.

Application December 20, 1955, Serial No. 554,255

7 Claims. (Cl. 113—99)

The present invention relates primarily to work holders and jigs for use in the assembling and welding of the parts and elements of a composite structure, and more particularly to a device of the above type that is useful in the layout, assembly and welding together of the separate parts and elements of a structure such as, for example, a metal hand railing of the type commonly employed at the steps and/or doors of public and private buildings.

The above type railings usually have upper and lower rails welded to vertical posts at the ends thereof and a number of vertical spindles extending between and welded at their ends to the rails. Sometimes some of the spindles are formed into or have fixed thereto ornamental scrolls for decorative purposes. Since the railings are often used on masonry and stone steps, the dimensions of which are not likely to be uniform but vary considerably from one set of steps to another, the railing must be custom made for each installation. In addition some step railings have horizontal sections at the top and/or bottom ends thereof, and in all cases it is desirable to have at least the top rail continuous and all the spindles in a vertical position. Heretofore the fabricating of a step railing with or without a horizontal section at one or both ends required a great deal of time to lay out and weld together, and the welding had to be performed in inconvenient and awkward positions.

In view of the above, one of the principle objects of the present invention is to provide a jig for holding the parts of a metal railing in position to facilitate the welding thereof.

Another object of the present invention is to provide a welding jig of the above type that is readily adjustable to enable the laying out and welding thereon of railings for steps of different lengths and rise, or pitch.

In this connection, still another object of the present invention is to provide a welding jig of the above type that is adaptable for use in laying out and welding a railing having a horizontal section at either or both ends of the sloping or step section thereof.

Another object of the invention is to provide a welding jig or railings wherein the horizontal section or sections are automatically placed in proper position with respect to the sloping section when setting the jig for the desired sloping section.

Still another object of the present invention is to provide a welding jig or work holder that will facilitate the laying out and welding of a metal railing, and is rotatable about a horizontal axis so that after the parts are placed and clamped thereon the jig may be rotated to enable the welding of the parts together to be performed in the most convenient position.

The above and further objects of the present invention will be more apparent in the following detailed description of the preferred embodiment thereof wherein reference is made to the accompanying drawings, in the latter of which:

Fig. 1 is a plan view of the work holder or jig for holding the parts of a metal railing during the welding thereof together;

Fig. 2 is a side elevational view of the work holder of Fig. 1;

Fig. 3 is a right hand end view of the jig;

Fig. 4 is a partial sectional view taken substantially on line 4—4 of Fig. 1 and showing a section of one type of railing clamped to the jig;

Fig. 5 is a view similar to Fig. 4 but showing a section of a different type of railing associated with the jig;

Fig. 6 is a partial sectional view taken substantially on line 6—6 of Fig. 1;

Fig. 7 is a partial sectional view taken substantially on line 7—7 of Fig. 1; and Fig. 8 is a fragmentary plan view of the jig with a section of a metal railing thereon.

Referring now to the drawings and particularly Figs. 1 and 2, the jig of the present invention is supported by a pair of vertical posts 11 and 12 adjacent the ends thereof. The posts 11 and 12 may be pieces of pipe and preferably are of such length that the main part of the jig is at a convenient working height such as that of the conventional work bench. Horizontal channel members 13 secured to the lower ends of the posts 11 and 12 keep the posts in a vertical position and prevent the jig from tipping.

Secured to the upper ends of the posts 11 and 12, as by welding, are short horizontal tubular members 14 which pivotally support therein slightly longer cylindrical members 16. The tubular member 14 and the cylindrical members 16 may be, if desired, sections of pipe of the proper size and secured to the inner end of the cylindrical members 16 are short depending links 17. The links 17 have secured to the lower ends thereof a horizontal structural member 18, such as a pipe, extending substantially the length of the entire structure between the posts 11 and 12. The links 17, as will hereinafter be described, lower the center of gravity of the pipe 18 and the structure supported thereby with respect to the pivotable supports 14 whereby it is more conveniently and easily rotated from one position to another.

Welded to the top of the pipe adjacent each end and at the center are three plates 19, Figs. 6 and 7, to the top of which are secured separate circular discs 21. The discs 21 are of sufficient size to provide suitable support for the structure associated therewith, and extending upward from the centers thereof are threaded members such as bolts 22. The bolts 22 hold other discs 23 in registry with the discs 22 while permitting them to turn or rotate with respect thereto. As will be noted in Fig. 1, the left hand and center discs 23 are circular while the right hand disc 23 has a straight side at its right hand edge.

To provide rigidity to the pipe 18, which because of its length might be somewhat flexible, a series of stabilizing rods 24 are associated therewith. The rods 24 are three in number and the ends are welded to the pipe 18 adjacent its ends 120° apart. At the center of the pipe 18 the top two rods 24 are welded to the edges of the center disc 22 and the other rod is spaced from the pipe by a spacer 26. Turnbuckles 27 on the rods 24 permit them to be tensioned as required to maintain the pipe 18 in a substantially straight condition.

Secured to the top surfaces of the left hand and center discs 23, Figs. 1 and 2, are pairs of diametrically opposed radially extending arms 28. The arms 28 of the center disc 23 are slightly shorter than those of the left hand disc and the former have secured to the undersides thereof short block members 29 which extend beyond the outer end of the arms. The blocks 29 by means of suitable pins 31 pivotally support elongated bars 32. The bars 32 are preferably square in cross-section as are the arms 28, and the latter constitute the main part of the work supporting elements of the jig. The left hand ends of the bars 32 have short extending block members 33 secured to the underside thereof, which are pivotally attached by pins 31 to the ends of the arms 28 of the left hand disc 23. Since the pins 31 are all equal distances from the centers of their respective discs 23, the elongated bars 32 are at all times maintained in parallel relation to each other. As shown in Figs. 1 and 2, the arms 28 of the left hand disc 23 and the lower elongated bar 32 may have spacers 34 along the top thereof for purposes hereinafter apparent.

The right hand disc 23 has attached to the top of the straight-sided extension thereof to the right of its center bolt 22 a bar 36. The bar 36 has short cross-members 37 secured to the underside of its ends, and each cross-member 37 has secured to the top of its left hand end short extension members 38 and to the top of its right hand end bars 39. The right hand ends of the bars 39 are connected together by a cross-bar 41 secured thereto, and the connection may have reinforcing blocks 42 thereat. The bars 36, 39 and 41 form a rigid rectangular-shaped frame 40, and the upper surfaces of the bars are in substantially the same plane as the parallel bars 32. The lower cross-bar 39 may have a spacer 34' thereon of the same thickness as the spacer 34 on the bar 32.

The right hand ends of the bars 32 have secured thereto blocks 43 to the free ends of which are pivotally attached by pins 31 the left hand ends of extensions 38 of the cross members 37.

With the arms 28 and bar 36 at right angles to the pipe 18, the bars 39 are in alignment with the bars 32, and the rigid frame 40 is in effect an extension of the frame formed in part by the bars 32. The pivot pins 31 at the right hand end of the bars 32 and the bolt at the center of the right hand disc 23 are in alignment and therefore the frame 40 can be turned to an angle with respect to the frame formed by the bars 32 to some such position as shown by the dotted outline thereof in Fig. 1. The jig can be clamped in any such position by means of a clamping screw 46 threaded in an offset bracket 47 secured to the underside of one of the left hand arms 28. When the clamping screw is tightened, the upper end presses against the stationary disc 21 to prevent rotation of the upper disc 23 and its associated elements with respect to the lower stationary disc.

When the jig of the present invention is to be used in connection with fabrication of a metal railing that at least a part thereof is for a set of stairs, the jig can conveniently be set for the pitch or the vertical rise of the set of stairs relative to their horizontal dimension by means such as a conventional carpenter's square. In such cases one side of a carpenter's square 48, Fig. 1, is placed along a line 49 on the left hand arm 28 or the spacer 34 thereon, and the distance "X" measured from the pivot pin to the corner of the square. The distance "X" represents the stair rise dimension and the jig is then turned until the line 51 on the bar 32 or the spacer 34 thereon intersects the outer end of the dimension "Y" which represents the stair tread dimension. Instead of the dimensions "X" and "Y" representing a single rise and tread dimension, they may represent the average of such dimensions for a set of stairs or the ratio of these dimensions.

After the jig is set and clamped in the desired position by the clamping screw 46, such position being represented by the dotted outline of Fig. 1, and assuming the jig is to be used to fabricate a railing having a sloping section and a horizontal section at its upper end, the top rail 50, Figs. 4 and 8, of the railing, cut to the desired length, is placed on the top bar 32 and clamped thereto by clamps 52. The rail 50 may have a bend therein at the right hand pin 31 so that the angle therein corresponds to the angle between the bar 32 and the bar 39 thereat. The top rail 50 may be bent prior to its placing on the jig and in this assumed instance the railing when finished is to be provided with a sloping section leading upward to a horizontal section. If the railing is of the type that has an ornamental cap strip on the top rail thereof, the spacer 34 is removed from the lower bar 32 and the bottom rail 50' of the railing placed thereon. If the bottom rail 50' is to be of one piece, it is bent so that it extends parallel with and along the bar 32 and the bar 39 with the bend at the joint between the two bars, and is clamped thereto by means of clamps such as 52 (Fig. 4). In this type of railing construction the top and bottom rails have spaced along the length thereof openings through which the spindles 53 extend, and such openings are in registry with one another so that when the spindles are placed in these openings, they will be parallel with the arms 28 of the jig. With the spindles so placed, they may be welded at their extremities to the rails, and to facilitate the welding thereof the entire jig is rotatable on a horizontal axis, as will be hereinafter pointed out, to bring the welding points into a more convenient welding position.

In fabricating a railing having a solid ornamental top rail 54, such as shown in Fig. 5, the spaces 34 are placed on the bottom bars 32 and 39 and the bottom rail 50' of the railing clamped thereto. The top rail 54, being of somewhat greater width than the bottom rail, requires the spaces 34 adjacent the bottom rail to maintain the spindles in the desired plane. A series of clamping brackets 56 are secured to the outer side of the top bar 32 to assist in clamping the ornamental rail 54 to the bar 32. When the clamps are not required, the holding bolts are loosened and the clamps 56 rotated to their down position, such as that shown in Fig. 4.

Since the apertures in the rails through which the spindles 53 extend are equally spaced in both the bottom and top rails, such as that shown in Fig. 4, the spindles of the horizontal section of the railing as well as the spindles in the sloping section will all be parallel and in a vertical position when the railing is erected alongside the set of stairs for which it was made, and all spindles will be of the same length even though the sloping sections of the rail are closer together than those of the horizontal section.

In a similar manner a jig may be employed to fabricate a railing having a sloping section leading down to a horizontal section. In this case the platform section of the jig may be rotated in a counter-clockwise direction from the position shown in Fig. 1, or if desired the top rail of the railing may be placed on the lower one of the bars 32.

In fabricating railings of the type such as the sections shown in Figs. 4 and 5, and particularly the type shown in Fig. 5, the spindles 53 can be more conveniently welded to the railings when the spindles are at some position other than a horizontal position. In order to more conveniently position the railing for welding, the entire platform structure of the jig is rotatable about the pivotable supports at the ends of the pipe 18. To lock the jig in any one of its rotated positions, a semicircular plate 57, Fig. 3, secured to the right hand end of the pipe 18, as shown in Figs. 1 and 2, has around the periphery thereof a number of holes 58 which cooperate with a pin 59 slidably carried in a housing 61 welded or otherwise fixed to the upper section of the right hand post 12. The right hand end of the pin 59 extends through the center section of a hand lever 62 pivotally mounted at its lower end in a bracket 63 on the post 12. A spring 64 urges the hand lever 62 to the left to hold the pin in engagement with the disc 57 or in one of the holes thereof. To rotate the jig about a horizontal axis, the hand lever is pulled to the right against the action of the spring 64 to withdraw the end of the pin from one of the holes 58 and thereby unlock the jig so that the entire structure supported by the pipe 18 may be rotated about a horizontal axis. The upper end of the post 12 is slightly offset to permit the jig to be positioned in a substantially vertical position.

From the above it will be apparent that the present invention provides a convenient and versatile jig for use in fabricating metal railings and one that can be easily and readily changed to accommodate railings having different slopes or pitches, and wherein the horizontal sections of such railings are at the proper angle with respect to the sloping or pitched sections. Furthermore, the present invention provides for rotating the entire jig structure about a horizontal axis to position the points to be welded in the most convenient location and wherein the structure is locked in its desired positions.

While the invention has been shown and described in but a single modification thereof, it will be apparent that various modifications may be made therein without departing from the spirit or essential attributes thereof, and it is desired therefore that only such limitations be placed thereon as are imposed by the appended claims.

What is claimed is:

1. In a jig of the type described, a pair of spaced apart supporting members, a first frame structure supported thereby and having a pair of spaced apart parallel bars pivotally supported at the ends of a plurality of transverse members, a rigid rectangular frame having two opposite sides thereof pivotally connected to one end of each of said parallel bars and disposed in substantially the same plane as said first frame structure and with said two opposite sides of said rigid frame being in longitudinal alignment with said parallel bars when said transverse members are normal to said bars, said pivotally connected transverse members and parallel bars pivotally connected to said first frame constituting a parallelogram linkage to maintain vertical planes passing through said two opposite sides of said rigid frame normal to vertical planes passing through said transverse members during pivoting movement of said transverse members with respect to said parallel bars.

2. The combination as set forth in claim 1, and including means for locking said pivotable members in a pivoted position.

3. The combination as set forth in claim 1, and including means for rotating said first frame structure about a horizontal axis.

4. The combination as set forth in claim 3, and including means for locking said first frame structure in a plurality of rotated positions about said horizontal axis.

5. In a device of the type described including a pair of spaced apart supporting members, a rigid elongated transverse structure dependingly and pivotally supported from said supporting members and adapted for swinging movement about a horizontal axis, a plurality of pairs of horizontal flat-surfaced members secured to the upper side of said transverse structure with the upper member of each pair being rotatable with respect to the lower one about a vertical axis, a first and a second interconnected frame supported in a common horizontal plane from the top ones of said flat members, said first frame being rigid and rectangular, said second frame including a pair of spaced apart parallel bars pivotally connected together adjacent one end by a transverse member and at the other end to said first frame with two sides of said first frame being in alignment with said parallel bars with said transverse member normal to said bars, said pivotally connected transverse members and parallel bars pivotally connected to said first frame constituting a parallelogram linkage for maintaining the other two sides of said first frame parallel with said transverse member during pivoting movement through various angles of said transverse member with respect to said parallel bars.

6. The combination as set forth in claim 5, and including means for locking said transverse member and said parallel bars in angular adjusted positions.

7. The combination as set forth in claim 6, and including means for locking said rigid elongated transverse structure with its supported elements in various positions of rotation about its horizontally supported axis.

References Cited in the file of this patent

UNITED STATES PATENTS

| | | |
|---|---|---|
| 2,340,707 | Staley | Feb. 1, 1944 |
| 2,427,133 | Grabner | Sept. 9, 1947 |
| 2,648,896 | Krumm | Aug. 18, 1953 |